United States Patent
Petrus

(10) Patent No.: US 7,362,799 B1
(45) Date of Patent: Apr. 22, 2008

(54) METHOD AND APPARATUS FOR COMMUNICATION SIGNAL RESOLUTION

(75) Inventor: Paul Petrus, Santa Clara, CA (US)

(73) Assignee: ArrayComm LLC, San Jose, CA (US)

( * ) Notice: Subject to any disclaimer, the term of this patent is extended or adjusted under 35 U.S.C. 154(b) by 789 days.

(21) Appl. No.: 10/185,897

(22) Filed: Jun. 27, 2002

(51) Int. Cl.
  *H04B 3/46* (2006.01)
  *H04B 17/00* (2006.01)
  *H04Q 1/20* (2006.01)

(52) U.S. Cl. ................................ 375/224; 375/259

(58) Field of Classification Search ............ 370/252; 375/224, 259, 260, 285, 316, 340, 344, 349, 375/377
See application file for complete search history.

(56) References Cited

U.S. PATENT DOCUMENTS

| | | | |
|---|---|---|---|
| 5,206,601 A * | 4/1993 | Ready .................... | 329/317 |
| 5,343,209 A * | 8/1994 | Sennott et al. ........ | 342/357.02 |
| 5,426,668 A * | 6/1995 | Lechleider ............ | 375/267 |
| 5,548,834 A * | 8/1996 | Suard et al. ........... | 455/276.1 |
| 5,596,439 A * | 1/1997 | Dankberg et al. ..... | 398/35 |
| 6,738,438 B2 * | 5/2004 | Rick et al. ............. | 375/343 |
| 6,934,346 B2 * | 8/2005 | Lindoff et al. ........ | 375/349 |
| 6,940,914 B1 * | 9/2005 | Lo et al. ................ | 375/260 |
| 6,980,527 B1 * | 12/2005 | Liu et al. ............... | 370/280 |
| 6,999,541 B1 * | 2/2006 | Hui ........................ | 375/350 |
| 7,206,349 B2 * | 4/2007 | Linnartz et al. ....... | 375/260 |
| 2003/0026196 A1 * | 2/2003 | Chan et al. ............ | 370/203 |
| 2003/0081661 A1 * | 5/2003 | Stein et al. ............ | 375/150 |
| 2003/0081662 A1 * | 5/2003 | Rick et al. ............. | 375/150 |
| 2003/0086512 A1 * | 5/2003 | Rick et al. ............. | 375/343 |
| 2003/0128836 A1 * | 7/2003 | Stephens et al. ...... | 379/399.01 |
| 2004/0038687 A1 * | 2/2004 | Nelson .................. | 455/456.1 |
| 2004/0042536 A1 * | 3/2004 | Rowitch et al. ....... | 375/150 |
| 2005/0096077 A1 * | 5/2005 | Moon .................... | 455/522 |
| 2006/0104342 A1 * | 5/2006 | Shanbhag et al. .... | 375/234 |

* cited by examiner

*Primary Examiner*—Jean B. Corrielus
(74) *Attorney, Agent, or Firm*—Blakely Sokoloff Taylor & Zafman

(57) ABSTRACT

Embodiments of the present invention provide methods and apparatuses for determining a parameter value for each of a plurality of communication signals received concurrently as a composite signal. The parameter value of each communication signal is within a corresponding parameter value set. Each parameter value set is disjoint from every other parameter value set. The parameter value for a particular communication signal is estimated by searching over the parameter value set corresponding to the particular communication signal. For one embodiment, the composite signal is received at a base station receiver of a SMDA/TMDA system that includes an array of spatially distributed antenna elements. To recover multiple communication signals at once, an embodiment of the invention segments the timing search window into disjoint intervals and invokes an instance of a basic receiver module for each timing search window.

14 Claims, 4 Drawing Sheets

METHOD AND APPARATUS FOR COMMUNICATION SIGNAL RESOLUTION

FIELD

The present invention applies generally to signal processing in radio communication systems, and more particularly to using parallel processing to determine parameter values for multiple communication signals received within a composite signal.

BACKGROUND

Radio communication systems may have a cellular architecture, with each cell corresponding roughly to a geographical area. Each cell includes a base station (BS), which is a local central cite through which a number of radio transmitter/receiver units (user terminals (UTs)) gain access to the communications system. The UTs could be, for example, telephones, PDAs, or small modem boards. A UT establishes a communication link with other UTs by requesting access to the system through the BS. Each UT communicates over a communication channel distinguished from other UTs.

Various techniques exist to increase the number of available channels for a given number of available frequencies. Time division multiple access (TDMA), for example, divides a single frequency into multiple time slots. Each of the time slots can then be allocated to a separate communication channel. Other known techniques include code division multiple access (CDMA) and frequency division multiple access (FDMA), which, like TDMA, are considered conventional multiple access schemes.

Radio communications systems may employ a spatial division multiple access (SDMA) scheme in conjunction with one or more conventional multiple access schemes to increase the number of UTs that a BS can serve for a given number of available frequencies. A SDMA scheme may be implemented using a BS that has an array of receiver antenna elements. The antenna elements are spaced, one from another, typically about a half of a meter apart. The array of antenna elements introduces multiple versions of the signal received from a UT. Each of these versions includes co-channel interference and noise. The co-channel interference is the result of multiple UTs attempting to randomly access the system on the same channel at the same time. Due to the spacing of the antenna elements, the amplitude and phase of a signal from a particular UT relative to the interfering UTs will be different for each of the multiple versions of the signal. By appropriately processing the multiple versions of the signal, it is possible to spatially determine multiple signals on the same communication channel, thereby increasing the number of UTs that can be served on a particular channel. To do this requires the ability to separate a particular signal from a number of signals from UTs attempting to communicate on the same channel at the same time. A number of methods are available for concurrent separation and successful resolution of such colliding signals. This may be done by determining one or more signal parameters that differ from one signal to another. The signal parameters are used to differentiate between the multiple colliding signals. Such parameters may include timing offset, frequency offset, spatial signatures and training data. The number of signals that may be recovered depends on the method, but generally, resolving more concurrent signals requires more computation. If the number of concurrent signals exceeds the receiver's capabilities, some of the signals are lost.

For example, a system that employs SDMA in conjunction with a TDMA scheme using a multi-antenna element receiver may use training sequences to determine a set of spatial weights to be applied to the signal received at each of the respective antenna elements. The training sequences, which allow transmissions from different UTs to be distinguished, are known as priori at the BS receiver. When the training sequence is received from a particular UT, the processing at the receiver attempts to distort the received signal such that it resembles the known training sequence. Spatial weights are determined and applied to the received signal to minimize the difference (error) between the received signal and the training sequence for a given timing offset. The training sequence is shifted over a set of different timing offsets within a timing window in order to minimize the error. This provides spatial weights and a course timing offset for each signal. That is the signal having the timing offset that minimizes the error is determined to be the signal from the particular UT, and spatial processing is used to extract that UT's signal. Typically, if two or more UTs are attempting to access the system on the same channel (having the same training sequence), having different timing offsets within the same timing window, the system will allow access to the strongest signal and discard the others. The UTs whose signals were discarded attempt access to the system after some delay. Alternatively, if it is desired to receive two, or more of the signals, the signals must be processed in parallel on the same digital signal processor (DSP). The receiver DSP may simply not have enough processing power, and it may not be economical or efficient to equip a BS receiver with a DSP having the required processing power. Typically a BS receiver has multiple DSPs with lower processing power.

A good signal resolution method should be both computationally efficient and scalable. A method is "scalable" if it can be easily configured to recover signals from more UTs when it is given more capable hardware. That is, the algorithm should be able to determine the parameter values of a greater number of communication signals given greater processing power.

SUMMARY

Embodiments of the present invention provide methods and apparatuses for determining a parameter value for each of a plurality of communication signals received concurrently as a composite signal. The parameter value of each communication signal is within a corresponding parameter value set. Each parameter value set is disjoint from every other parameter value set. The parameter value for a particular communication signal is estimated by searching over the parameter value set corresponding to the particular communication signal. For one embodiment, the composite signal is received at a base station receiver that includes an array of spatially distributed antenna elements.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

An embodiment of the present invention provides a receiver capable of resolving multiple communication signals by combining multiple instances of a basic receiver module. The communication signals are resolved by determining a parameter value for each. Each receiver module searches an orthogonal (disjoint) parameter value set to determine the parameter value for each communication signal. In one embodiment the multiple receiver modules may be implemented sequentially upon a single digital processing device (dedicated architecture). In an alternative embodiment, each of the multiple receiver modules may be implemented in parallel upon separate digital processing devices.

In the following description, numerous specific details are set forth. However, it is understood that embodiments of the invention may be practiced without these specific details. In other instances, well-known circuits, structures and techniques have not been shown in detail in order not to obscure the understanding of this description. Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

For example, the following description relates to an embodiment of the invention that provides a signal-processing algorithm for use in a multi-antenna receiver in a radio communication system employing SDMA in conjunction with a TDMA scheme (SDMA/TDMA system). For such an embodiment, the parameter of interest is the timing offset and the algorithm of the present invention allows the resolution of multiple communications signals received in the same TDMA timeslot. It will be appreciated that, in alternative embodiments of the present invention, the parameter of interest may be something other than timing offset (e.g., frequency offset, angle of arrival, etc.). Moreover, alternative embodiments of the present invention are equally applicable to systems in which the receivers do not employ multi-antenna architectures.

Figure 1:
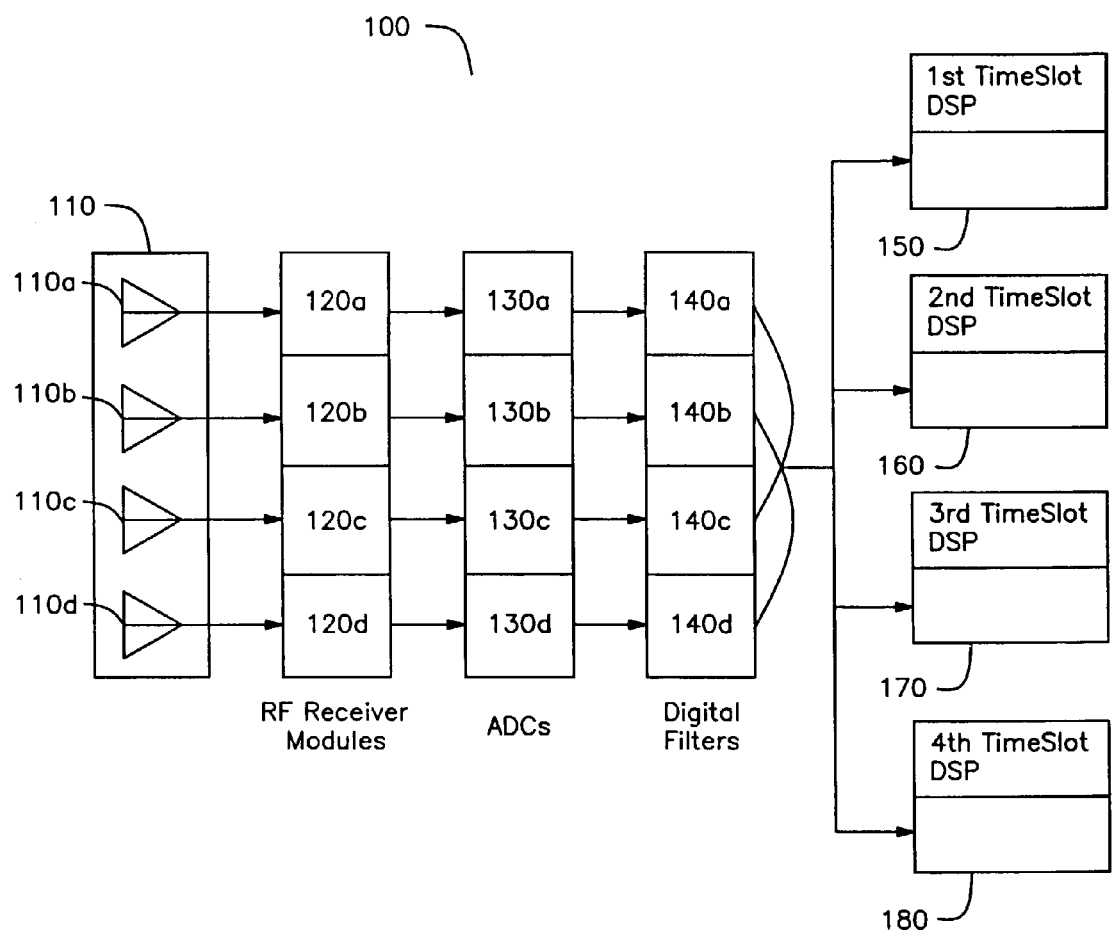
FIG. 1 illustrates a base station receiver employing dedicated architecture in which multiple parallel beamformers are implemented in a single DSP.

FIG. 1 illustrates a functional block diagram of a base station receiver in accordance with one embodiment of the present invention. Receiver 100 includes a spatially distributed antenna array 110 in order to support a SDMA-based system. Antenna array 110 has four antenna elements 110a-110d. The number of antenna elements may vary. The received signal from each antenna element 110a-110d is input to a corresponding receiver module 120a-120d. The signals are then mixed down in analog from the carrier frequency to an FM intermediate frequency ("IF"). Each signal is then digitized (sampled) by corresponding analog to digital converters ("ADCs") 130a-130d. Final down-converting to baseband is carried out digitally by digital filters 140a-140d. Each digital filter has a number of outputs corresponding to the number of received TMDA timeslots (timeslots). The particular number of timeslots can be varied. In the present example, there are four down-converted output signals from each digital filter 140a-140d. For each of the four timeslots, the four down-converted output signals from the four digital filters 140a-140d are fed to one or more digital processing devices (e.g., digital signal processors (DSPs)). For example, for a first timeslot, the four output signals of digital filters 140a-140d are fed to one or more DSPs that will resolve multiple communication signals received in the first timeslot. Colliding signals (signals received in the same timeslot having the same training data, but different timing offsets) can be resolved in accordance with one embodiment by implementing multiple parallel receiver modules in either a centralized (dedicated) architecture or a distributed architecture.

FIG. 1 illustrates a base station receiver employing dedicated architecture in which multiple parallel beamformers are implemented in a single DSP. Beamformers combine the multiple antenna measurements so as to minimize the interference between signals and maximize the signal-to-interference-plus-noise ratio (SINR) of each communication signal received. As shown in FIG. 1, the four output signals of digital filters 140a-140d, corresponding to a particular timeslot, are fed to first timeslot DSP 150. In accordance with one embodiment, DSP 150 processes and resolves two or more communication signals received in timeslot 1. A number of beamformers are implemented on DSP 150, corresponding to the number of communication signals to be resolved in a single timeslot in accordance with the teachings of the present invention. The four output signals of digital filters 140a-140d, corresponding to particular respective timeslots, are likewise fed to second timeslot DSP 160; third timeslot DSP 170; and fourth timeslot DSP 180.

Figure 1A:
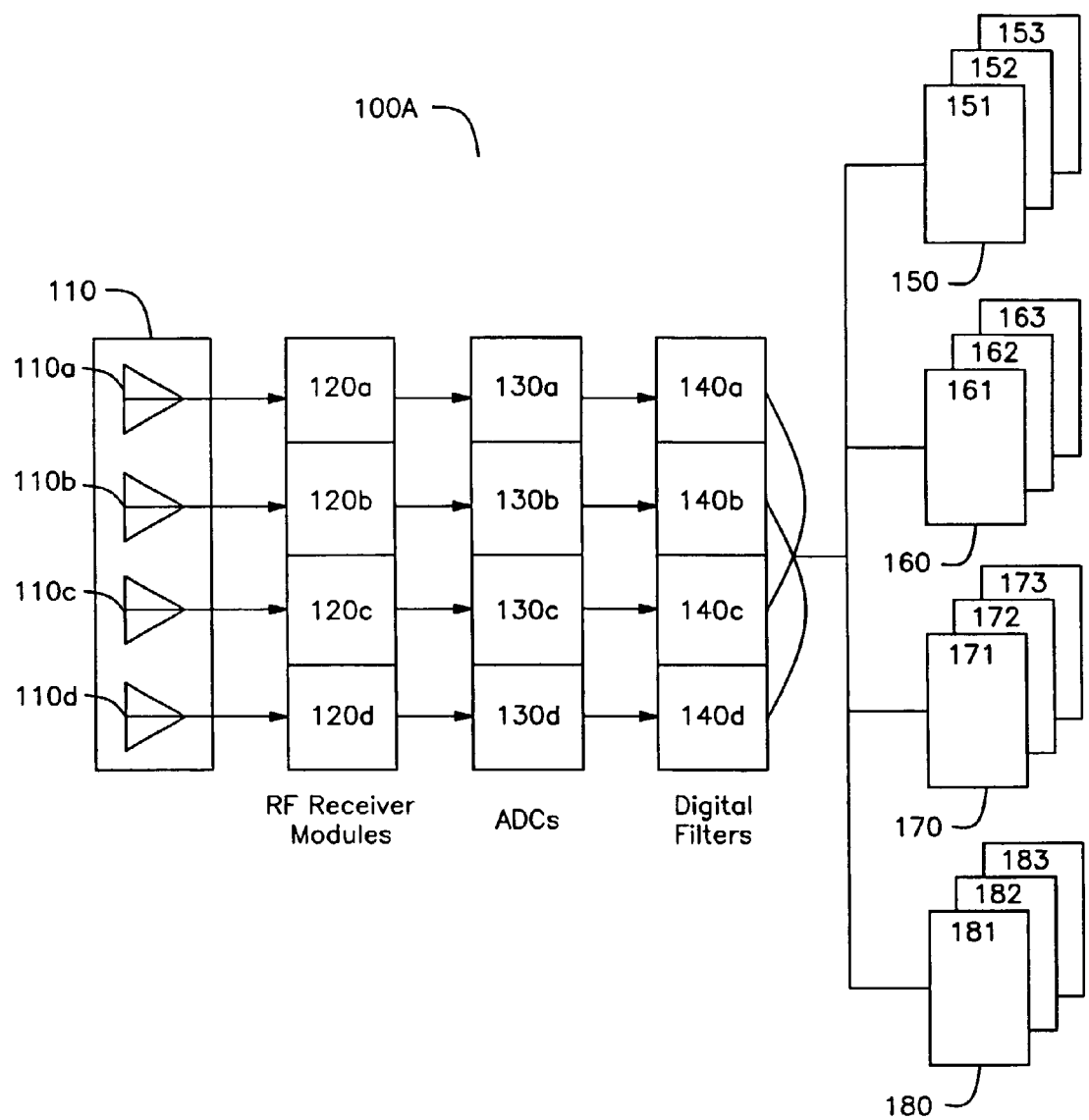
FIG. 1A illustrates a base station receiver employing distributed architecture in which each of multiple parallel beamformers is implemented in a corresponding DSP.

In an alternative embodiment, a distributed architecture may be employed. In a distributed architecture, a receiver may employ multiple DSPs in parallel to process multiple signals received in the same timeslot, with each DSP processing a particular signal. That is, each DSP may operate on orthogonal time windows and in turn each DSP can search for multiple signals within the orthogonal window. FIG. 1A illustrates a base station receiver employing distributed architecture in which each of multiple parallel beamformers is implemented in a corresponding DSP. As shown in FIG. 1, the four output signals of digital filters 140a-140d, corresponding to a particular timeslot, are fed to each DSP of first timeslot DSP set 150 that includes multiple DSPs, for example DSPs 151, 152 and 153. In accordance with one embodiment, DSPs 151, 152, and 153 process and resolve multiple communication signals received in timeslot 1, in parallel. A receiver may implement any number of DSPs thusly, corresponding to the number of communication signals to be resolved in a single timeslot in accordance with the teachings of the present invention. As shown in FIG. 1A, the four output signals of digital filters 140a-140d are likewise fed to each DSP of second timeslot DSP set 160 that includes, DSPs 161, 162 and 163; third timeslot DSP set 170 that includes DSPs 171, 172 and 173; and fourth timeslot DSP set 180 that includes DSPs 181, 182 and 183.

The output of the DSPs is a demodulated bit set for each of the received communication signals. This data is sent to a host DSP, not shown, whose main function is to control all elements of the system and interface with the higher level processing, which is the processing which deals with what signals are required for communications in all the different control and service communication channels defined in the system's communication protocol. The host DSP maintains state and timing information, receives uplink burst data from the timeslot processors, and programs the timeslot processors. In addition the host DSP decrypts, descrambles, checks error correcting code, and deconstructs bursts of the uplink signals, then formats the uplink signals to be sent for higher level processing in other parts of the base station. The host DSP also manages programming of other components of the base station including the transmit controller/modulator and the RF timing controller, not shown.

Figure 2:
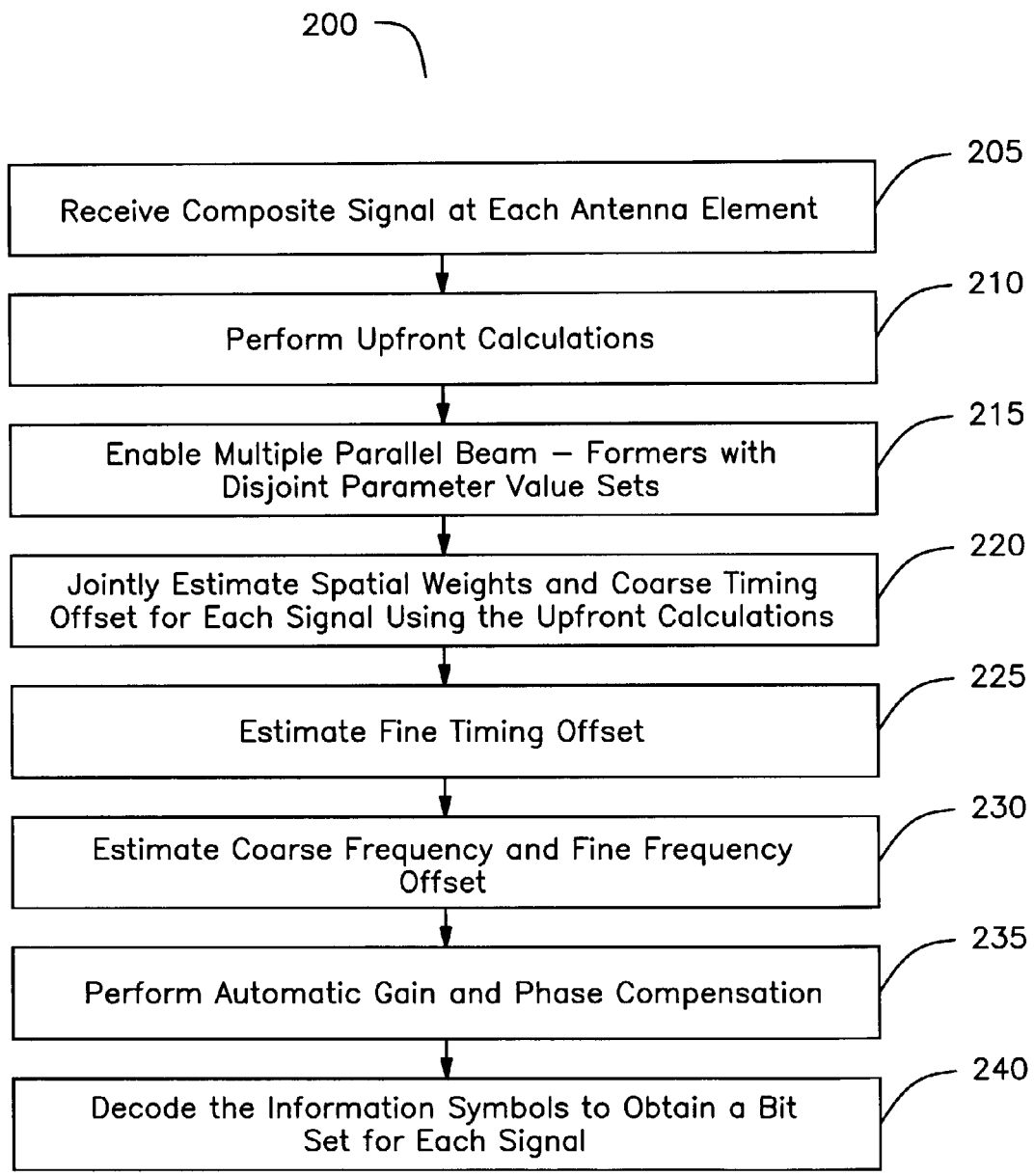
FIG. 2 is a process flow diagram of a process by which multiple communication signals are processed and resolved in a SDMA/TDMA system employing a dedicated architecture in accordance with one embodiment of the invention.

FIG. 2 is a process flow diagram of a process 200 by which multiple communication signals are processed and resolved in a SDMA/TDMA system employing a dedicated architecture in accordance with one embodiment of the invention. For an SDMA/TDMA system, the multiple beamformers have disjoint timegrids (timing windows). The process described in FIG. 2 may be implemented in a DSP, for example, first timeslot DSP 150 as described above in reference to FIG. 1.

Process 200 begins at operation 205 in which a composite signal is received at each of the antenna elements of a receiver having an array of spatially distributed antenna elements. The composite signal is composed of a number of communication signals from different UTs, together with noise and other interference. The composite signal may include one or more reflections of the communication signals from different UTs. The communication signals will generally, be received at the base station receiver with different timing offsets, but arriving in the same timeslot.

In order to resolve the communication signals from the composite signal, spatial weights and timing and frequency offset are determined for each communication signal.

At operation 210 up-front computations are performed on the composite signal for use in determining the spatial weights. Such computations may include, for example determining a spatial covariance matrix and performing a Cholesky decomposition on the spatial covariance matrix. Such computations may be done only once and used by all the beamformers operating on the same signal. In alternative embodiments, for example in distributed architecture embodiments, each DSP may perform such upfront computations. In another alternate embodiment, where the parallel beamformers are implemented on separate DSPs, a single DSP may perform the upfront computations and transmit the results to other DSPs, eliminating the need for the other DSPs to perform these computations.

At operation 215 multiple parallel time beamformers are enabled by setting the beamformer analysis window, or timing window, of each time beamformer to a disjoint time interval. For example, consider a system in which it is known that the signal is received at the BS receiver with a time uncertainty of +/−4 symbols (+/−8 microseconds for a system having a symbol period of 2 microseconds). If the BS receiver can support two parallel beamformers, then the timing window of the first time beamformer is set to span between −8 and 0 microseconds, while the timing window of the second time beamformer is set to span from 0 and 8 microseconds. That is, the known timing window is divided into two disjoint intervals to be used by the two parallel time beamformers, respectively. In a dedicated architecture, the processing of signals within one timing window is performed and then the processing of signals within the other timing window(s) is performed sequentially. In a distributed architecture, there is a fork at this point, with processing of signals within each timing window being performed by time beamformers implemented on separate DSPs. Each time beamformer estimates fine timing and frequency offset corresponding to the signal with the largest power received within the beamformers timing window as described below.

Spatial Weights and Coarse Timing Estimation

At operation 220 each time beamformer jointly estimates spatial weights and coarse timing offset for the signal from each antenna using the upfront computations performed at operation 210. The first time beamformer estimates weights to recover a signal whose timing offset is between −8 and 0 microseconds from a nominal timing offset, and the second time beamformer estimates weights to recover a signal whose timing offset is between 0 and 8 microseconds from the nominal timing offset. Thus, the two beamformers together search for signals over the full timing window interval (e.g., −8 to 8 microseconds). Both beamformers will perform the same operations on their respective time window. If it is desired to resolve more than two communication signals, additional time beamformers maybe implemented (provided the receiver will support them). In such case, the known timing window is segmented into a number of disjoint intervals corresponding to the number of beamformers implemented. The timing windows are set such that no timing window overlaps another (disjoint) to ensure that the receiver does not process a single communication signal on two beamformers. Even so, it is possible that a reflection of a communication signal, which may arrive with a different timing offset, will be viewed by the receiver as a legitimate separate communication signal. This situation is addressed below in reference to FIG. 3.

Each time beamformer estimates the spatial weights and the coarse timing offset in a joint fashion by minimizing the difference between a weighted reference input signal and a time shifted, locally generated, version of the reference signal. These estimates are computed by minimizing the following error function:

$$e = \langle |w'z - s\_\text{tau}|^2 \rangle$$

where z is the input oversampled signal from the array of antennas corresponding to the training data, s_tau is the oversampled locally generated training data shifted in time by tau, w is the spatial weight vector, ' is the conjugate transpose operator, and <.> is the time averaging operation.

The amount by which the signal is time shifted, tau, which is typically a fixed value, is based on the timing uncertainty with which the signals arrive. The accuracy of tau is related to the oversampling factor of the received training sequence signal. In one embodiment, the timing search is based on values of tau that are spaced sample duration apart, and the best tau value (corresponding to the minimum error) is chosen as the coarse time alignment. In another embodiment, the best two tau values are chosen and a follow up search is done using an average of the two best tau values.

For various time shifts, tau, the error function is directly computed without computing the weights. The time shift that results in the minimum error is chosen as the coarse timing offset. The least squares weight is then estimated, for the chosen coarse timing offset, as follows:

$$w=\text{inv}(Rzz)*rzs\_\text{tau}$$

where $Rzz=z*z'$ is the covariance matrix, $rzs\_\text{tau}=z*s\_\text{tau}'$ is the cross correlation vector, and inv is the matrix inverse operator.

In an alternative embodiment, the error function and the weights are computed using the Cholesky matrix. That is, Cholesky decomposition is performed on the covariance matrix, resulting in a lower triangular matrix, L. Equivalently, covariance matrix (Rzz)=LL'.

Fine Timing Estimation

The input signals from the multiple antenna elements are weighted using the spatial weight vector computed at operation 220 and combined. At operation 225, fine timing estimation is carried out on the combined signal. For one embodiment, the combined signal is passed through a non-linear device followed by a narrowband filter that delivers a near sine wave at the symbol frequency. The general form of non-linearity commonly used is, $$F(x)=|x|^m,$$

where m=1 (absolute), 2 (square-law) or 4 (fourth-law) and x is the spatially combined signal. The choice of non-linearity depends on the excess bandwidth of the signal, the SNR and the modulation format. The absolute non-linearity has the least timing variance for all roll-off factors. An approximation to the absolute function to reduce computational burden is used. The combined signal is correlated to a complex sinusoid at the signal baud rate to obtain the timing estimate. The angle of the correlation provides the timing information. Additionally, the oversampled signal or combined signal (time-corrected) can be used to obtain the baud-spaced symbols. For one embodiment, the spatial weights are applied only to the training data and the fine timing is estimated. However, because the estimation algorithm is independent of the modulation scheme of the received signal, an alternate embodiment can use symbols from the payload.

At operation 230 the coarse frequency offset and fine frequency offset are estimated.

Coarse Frequency Estimation

In one embodiment, the baud aligned received signal is correlated with the locally generated training signal rotated by a fixed set of complex sinusoids, whose frequencies correspond to the search frequency increments. The frequency increment value that results in the maximum correlation is chosen as the coarse frequency offset.

In an alternate embodiment, an oversampled training signal is locally generated and time aligned with the received signal based on the coarse and fine time estimate from the previous blocks. Then the locally generated training signal is shifted in frequency, corresponding to a fixed set of frequencies. This signal is then correlated with the spatially combined signal and the frequency that results in the maximum correlation is chosen as the coarse frequency offset.

Fine Frequency Estimation

A frequency beamformer is employed to estimate the fine frequency alignment. This is similar to the time beamformer, except that the reference signal is shifted in frequency and not in time. A set of frequency increments is chosen and the error function is computed that results in the minimum error. The frequency increments are centered around the coarse frequency alignment that is determined as discussed above in reference to operation 230. In this case, the error function is computed by shifting the oversampled locally generated training data in time and frequency. The time used is the fine timing estimate discussed above in reference to operation 225. Then the weight vector, with the locally generated training signal shifted in time and frequency to match the received signal, is computed. Unless the minimum error from the frequency beamformers is more than the minimum error from the time beamformers, then the spatial weight from the time beamformer is used and the estimated fine time alignment and frequency offset are discarded.

In an alternate embodiment, the received multi-antenna signal is time aligned and frequency shifted and used in the error function calculated. In this case, the baud samples of the training data is used as it is. In one embodiment the multi-antenna signal and the spatial weights are combined and timing and frequency offset correction is applied to the combined signal. In another embodiment, if the frequency beamformer operated on a baud-aligned received signal, then apply the spatial weights to combine the multi-antenna signal. The spatial weight vector may then be recomputed using the best of all estimates to minimize error and applied to the input signal. After the weight vector is applied, the symbol timing alignment is applied using a filter bank. This provides baud-aligned samples at the baud rate. The frequency offset is compensated on these baud-aligned samples.

After the spatial weights, timing offset, and frequency offset have been estimated, this information is used to calculate the SINR for each communication signal. If the SINR is not above a specified threshold, the signal is not detected (not considered a legitimate communication signal). The SINR is also used as a measure of signal quality.

Automatic Gain and Phase Compensation (AGPC)

Depending on the coarseness of the frequency increments, there may still be a residual frequency offset in the processed signal. Also the signal may have undergone fading so the amplitude may drift across the burst. At operation 235, an APGC is carried out on the signal to compensate for amplitude and phase variation across the burst. If the signal has training data at both the ends of the burst, the locally generated training data, corresponding to both ends, are correlated with the processed signal. The resulting correlations provide the amplitudes and phases corresponding to the beginning and the end of the burst. To compensate, the phase at an intermediate time in the burst is taken to be the linear interpolation of the phase at the start of the burst and the estimated phase at the end of the burst. For example, two single tap equalizers may be computed based on the training data at the beginning and the end of the burst. Suppose x1, z1, x2, and z2 denote the reference and received training data at the beginning and at the end of the burst, respectively. The equalizer taps for the beginning and the end are computed as:

Begin-->phi1=z1'x1/z1'z1, where ' is a conjugate transpose operator, and

End-->phi2=z2'x2/z2'z2, where ' is a conjugate transpose operator.

Based on these two estimates, a time-varying single-tap equalizer is computed for the intermediate segment. The amplitude and phase of this time-varying equalizer are obtained by linearly interpolating the amplitude and phase corresponding to either ends of the burst. Other interpolation methods may be used. The amplitude may similarly be interpolated.

If the signal has training data only in the beginning of the burst, and not at the end, then the initial and the final segments of the training data are used in the AGPC estimation. The amplitudes and phases corresponding to the initial and the final segments are estimated. To compensate for the amplitude and phase drift across the payload, the amplitude and phase estimates from either end of the training data are linearly extrapolated.

The interpolated or extrapolated values for amplitude and phase drift are used to compensate the payload symbols.

Decoder

The decoder gets the on-baud samples and then decodes the information symbols to obtain a bit set for each communication signal at operation 240. The decoder architecture depends on what type of encoder is used in the transmitter.

Figure 3:
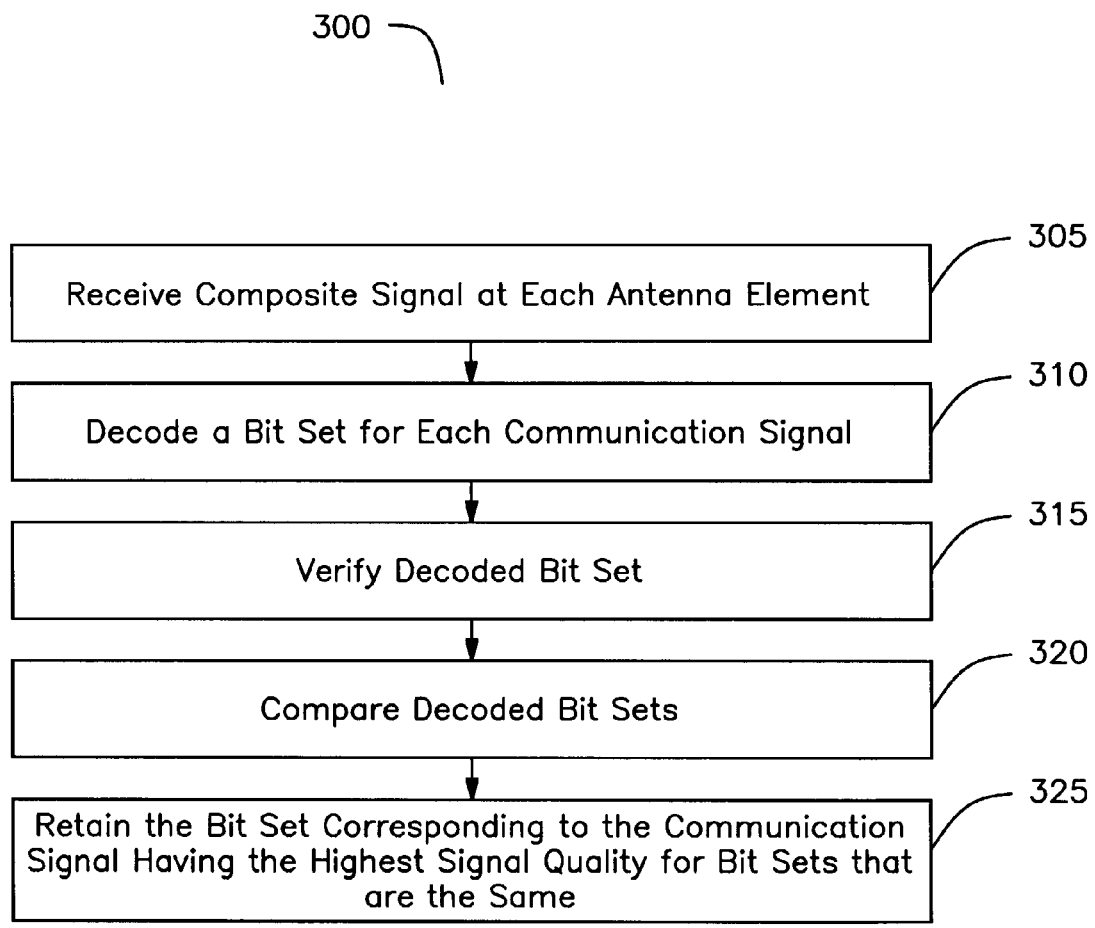
FIG. 3 is a process flow diagram of a process by which reflective signals are identified and discarded in accordance with one embodiment of the present invention.

As described above, the received composite signal may contain one or more communication signals that are reflections of a legitimate communication signal (a communication signal from a UT). FIG. 3 is a process flow diagram of a process by which reflective signals are identified and discarded in accordance with one embodiment of the present invention. Process 300, shown in FIG. 3, begins at operation 305 in which a composite signal is received at each of the antenna elements of a receiver having an array of spatially distributed antenna elements. The composite signal is composed of a number of communication signals from different UTs, together with noise and other interference. The composite signal may include one or more reflections of the communication signals from different UTs.

At operation 310, each of the communication signals within the composite signal is resolved and a bit set for each is decoded. This may be done as described above in reference to FIG. 2. In such an embodiment, decoding encompasses estimating the spatial weights, timing offset, and frequency offset, and applying these values to the communication signal to obtain the information symbols. The information symbols are then fed to the decoder to obtain the bit set for the communication signal. In alternative embodiments, each communication signal may be resolved through other means as known in the art.

At operation 315, the decoded bit set is verified to ensure it is correct. This verification may be accomplished through a variety of known data integrity methods including performing a cyclic redundancy check (CRC).

At operation 320, if the CRC is correct, the decoded bit sets of each communication signal are compared. Bit sets that are identical indicate that reflection of a legitimate communication signal was received. Reflective communication signals may be determined where two or more decoded bit sets are the same to within some specified value. If the bit sets are different, the corresponding signals are identified as distinct, legitimate, communication signals.

At operation 325 the signal quality of each communication signal corresponding to identical bit sets is compared. The communication signal having the greatest SINR, is retained and process while other communication signals having the same corresponding bit sets are discarded. In alternative embodiments, other measures of signal quality may be used to determine which communication signal to retain.

General Matters

Embodiments of the present invention provide scalability for communications signal resolution. By implementing multiple beamformers with disjoint parameter value sets, an embodiment of the invention supports both parallel and serial signal resolution processing as well as reuse of the basic receiver module. The scalability of embodiments the invention lies in the implementation of multiple "basic" receiver modules that estimate weights for a communication signal whose timing offset is restricted to a timing window. To recover multiple communication signals at once, an embodiment of the invention segments the timing search window into disjoint intervals and invokes an instance of the basic receiver module for each timing search window.

Embodiments have been herein described in reference to a SDMA/TDMA system in which the parameter of interest for the timing offset of the communication signal. In alternative embodiments, the invention is applicable to systems in which the parameter of interest is something other than timing offset (e.g., frequency offset, angle or arrival, etc.) Moreover, alternative embodiments are applicable to systems that do not employ an array of spatially distributed antenna elements. Additionally, the multiple beamformers may be implemented on a single DSP or on multiple DSPs in a distributed architecture.

The present invention includes various operations. The operations of the present invention may be performed by hardware components, such as those shown in FIG. 1, or may be embodied in machine-executable instructions, which may be used to cause a general-purpose or special-purpose processor or logic circuits programmed with the instructions to perform the operations. Alternatively, the steps may be performed by a combination of hardware and software. The operations have been described as being performed by a base station receiver. However, any operations, described as being performed by the base station receiver may be performed by the receiver of a user terminal. The invention is equally applicable to systems in which terminals communicate with each other without either one being designated as a base station, a user terminal, a remote terminal or a subscriber station.

The present invention may be provided as a computer program product that may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a radio data communication system, it can be applied to a wide variety of different systems in which data are exchanged. Such systems include voice, video, music, broadcast and other types of data systems without external connections. Many of the methods are described in their most basic form but operations can be added to or deleted from any of the methods and information can be added or subtracted from any of the described messages without departing from the basic scope of the present invention.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A radio communication system comprising:
a plurality of base stations, each base station servicing a plurality of user terminals, wherein each base station has a receiver that includes an array of spatially distributed antenna elements and receives communication signals from two or more user terminals, said communication signals received as a composite signal, each of said communication signals having a parameter value within a corresponding subset of a parameter value set for the composite signal, the subset for each communication signal orthogonal to respective corresponding parameter value subsets of other communication signals in the composite signal, such that each parameter value is estimated using the composite signal by searching over the corresponding subset of the parameter value set; and
a plurality of digital processing devices to estimate the parameter value for two or more of the communication signals in parallel, wherein each of the plurality of digital processing devices estimates a parameter value for a communication signal using a different parameter value subset and wherein a covariance matrix computation and a Cholesky decomposition are performed in one of the plurality of digital processing devices and a result of said covariance matrix computation and Cholesky decomposition is transmitted to each of the other digital processing devices.

2. The system of claim 1, wherein the parameter is timing offset and the composite signal is received in a time slot of a channel, and wherein searching over the corresponding subset of the parameter value set includes searching within a timing window, the timing window comprising a portion of the time slot of the channel in which the composite signal is received.

3. The system of claim 1, wherein each communication signal has a parameter selected from the group consisting of timing offset, frequency offset, and angle of arrival.

4. An article of manufacture comprising a computer-readable medium encoded with a computer program to provide instructions to result in an electronic device performing operations including:
receiving a composite signal, said composite signal including a plurality of communication signals, each communication signal having a parameter value within a corresponding subset of a parameter value set for the composite signal, the subset for each communication signal disjoint from the respective corresponding parameter value subsets of other communication signals in the composite signal;
estimating the parameter value for two or more of the communication signals in parallel using a plurality of digital processing devices, wherein a covariance matrix computation and a Cholesky decomposition are performed in one of the plurality of digital processing devices, and wherein a result of said covariance matrix computation and Cholesky decomposition is transmitted to each of the other digital processing devices;
recovering each communication signal from the composite signal; and
obtaining one or more payload symbols for each respective communication signal to obtain a bit set for each communication signal.

5. The article of manufacture of claim 4, wherein each of the plurality of digital processing devices estimates a parameter value for a communication signal using a different subset of the parameter value set.

6. The article of manufacture of claim 4, wherein each communication signal has a parameter selected from the group consisting of timing offset, frequency offset, and angle of arrival.

7. The article of manufacture of claim 4, wherein estimating the parameter value for each communication signal includes determining whether each communication signal is present.

8. The article of manufacture of claim 4, wherein the composite signal is received at a base station receiver, said base station receiver having an array of antenna elements, said composite signal comprising a set of antenna signals.

9. The article of manufacture of claim 8, wherein estimating the parameter value for each communication signal includes determining antenna weights for each communication signal.

10. The article of manufacture of claim 9, wherein the parameter is timing offset and the composite signal is received in a time slot of a channel, and wherein searching over the corresponding subset of the parameter value set includes searching within a timing window, the timing window comprising a portion of the time slot of the channel in which the composite signal is received.

11. The article of manufacture of claim 4, wherein estimating the parameter value for each communications signal includes making computations on the composite signal, the results of said computations common to each communication signal.

12. The article of manufacture of claim 4, wherein estimating the parameter value for each communications signal includes making computations on each of the communication signals independently at each of the digital processing devices.

13. A wireless user terminal, comprising:
a transmitter to transmit a first communication signal to a base station, the first communication signal having a parameter value within a corresponding subset of a parameter value set that is orthogonal to parameter value subsets of other communication signals transmitted to the base station and wherein the parameter value within the corresponding parameter value subset distinguishes the first communication signal from the other communication signals that arrive at the base station, the base station having a plurality of digital processing devices to estimate the parameter value for two or more of the communication signals in parallel, wherein a covariance matrix computation and a Cholesky decomposition are performed in one of the plurality of digital processing devices and a result of said covariance matrix computation and Cholesky decomposition is transmitted to each of the other digital processing devices.

14. The wireless user terminal of claim 13, wherein the first communication signal has a parameter selected from the group consisting of timing offset, frequency offset, and angle of arrival.

* * * * *